W. E. PARR.
SPEED INDICATOR.
APPLICATION FILED SEPT. 9, 1910.

1,004,544.

Patented Sept. 26, 1911.

3 SHEETS—SHEET 1.

Witnesses
Omar Crocker
L. N. Gilley

Inventor
W. E. Parr
By Chandler & Chandler
Attorneys

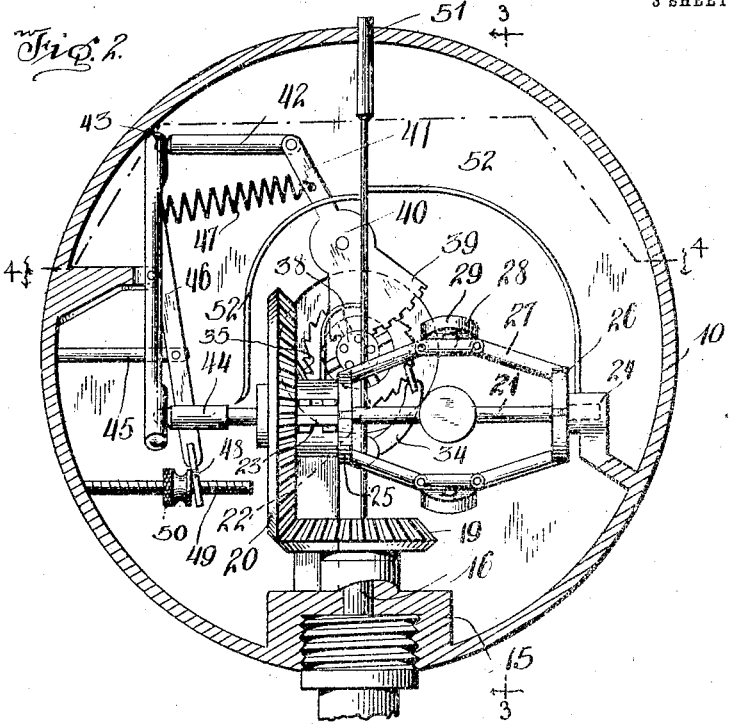

W. E. PARR.
SPEED INDICATOR.
APPLICATION FILED SEPT. 9, 1910.
1,004,544.
Patented Sept. 26, 1911.
3 SHEETS—SHEET 3.
Fig. 5.
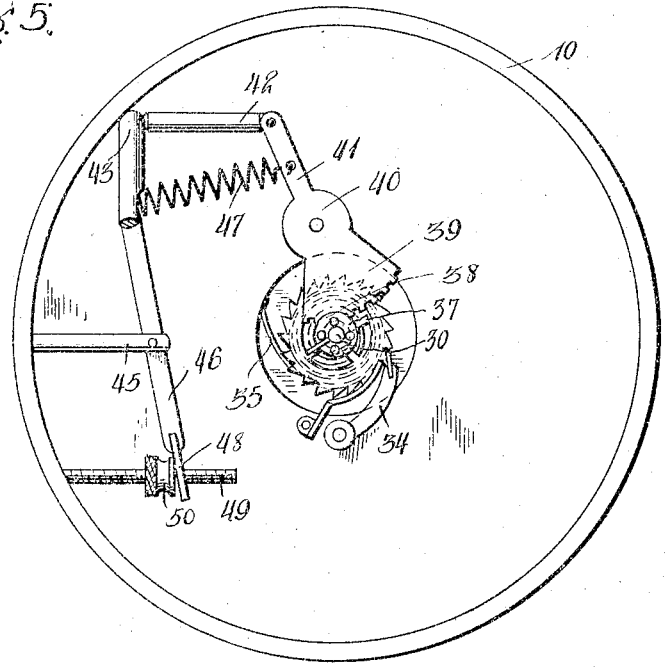
Fig. 6.
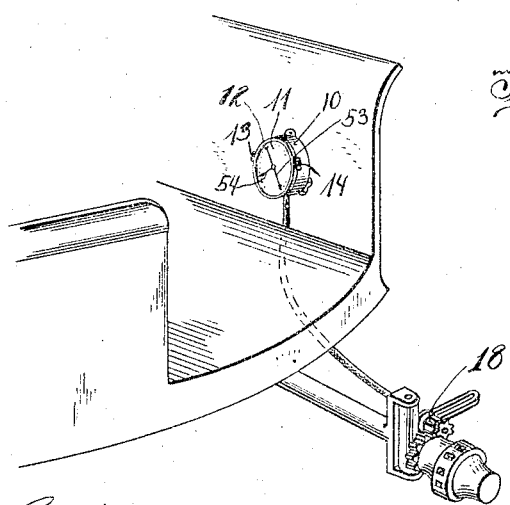
Witnesses
Inventor
W. E. Parr
By 
Attorneys

UNITED STATES PATENT OFFICE.

WALTER E. PARR, OF SPRINGFIELD, MISSOURI.

SPEED-INDICATOR.

1,004,544.  Specification of Letters Patent.  Patented Sept. 26, 1911.

Application filed September 9, 1910. Serial No. 581,222.

*To all whom it may concern:*

Be it known that I, WALTER E. PARR, a citizen of the United States, residing at Springfield, in the county of Greene, State of Missouri, have invented certain new and useful Improvements in Speed-Indicators; and I do hereby declare the following to be a full, clear, and exact description of the invention, such as will enable others skilled in the art to which it appertains to make and use the same.

This invention relates to speed indicators such as are used to indicate the speed of automobiles and other like vehicles.

The principal object of the invention is to provide an improved and simplified form of such indicator arranged not only to give the speed at which the vehicle is being run at any given time but also to indicate and register the maximum speed obtained during any run.

Another object of the invention is to provide an improved form of governor mechanism especially adapted for this purpose.

A third object of the invention is to provide an improved registering mechanism to be operated in connection with said governor.

With the above and other objects in view the invention consists in general of a speed indicator having an improved governor mechanism and an improved indicating mechanism.

The invention further consists in certain novel details of construction and combinations of parts hereinafter fully described, illustrated in the accompanying drawings, and specifically set forth in the claims.

Figure 1:
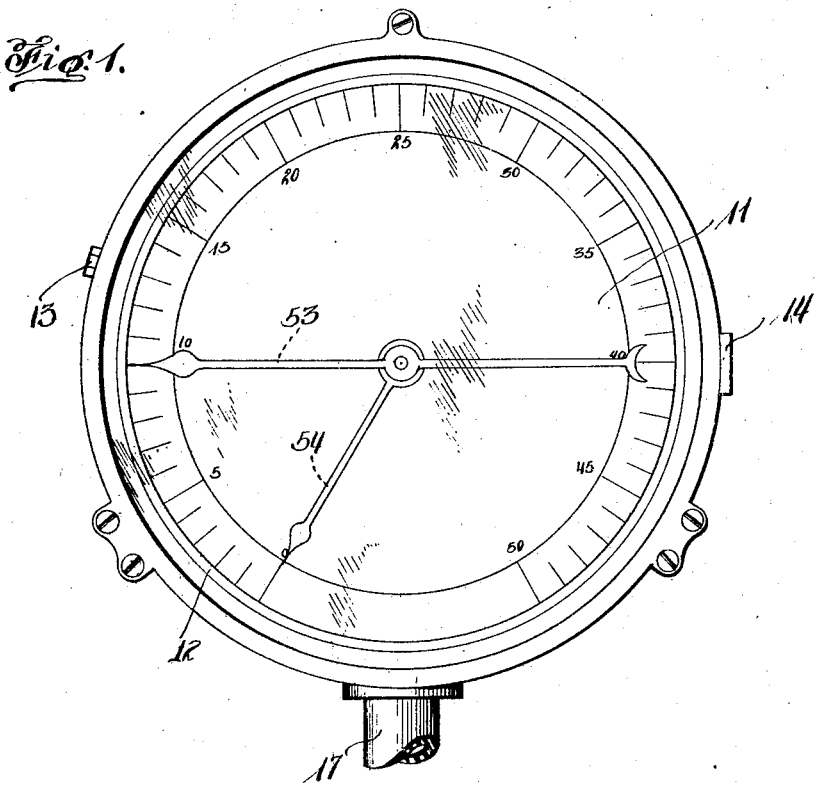
Figure 4:
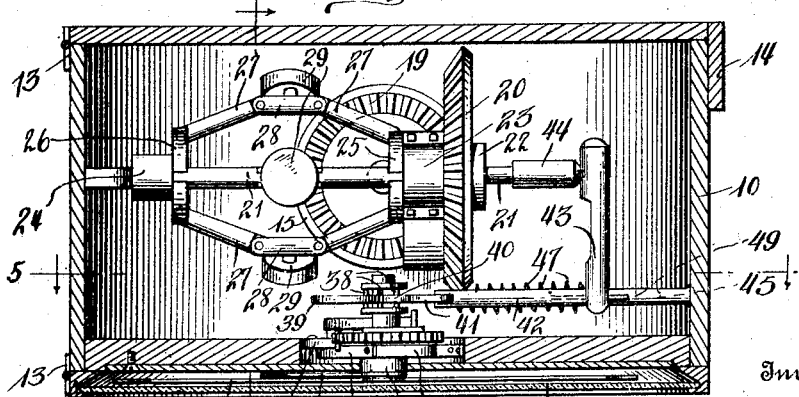

In the accompanying drawings, like characters of reference indicate like parts in the several views, and:—Figure 1 is a front view of the exterior of the device. Fig. 2 is a similar view with the front of the casing or dial removed. Fig. 3 is a section on the line 3—3 of Fig. 2. Fig. 4 is a section on the line 4—4 of Fig. 2. Fig. 5 is a section on the line 5—5 of Fig. 4. Fig. 6 is a view showing the application of the device to an automobile.

This device is preferably mounted in a cylindrical casing 10 the front of which is formed by a dial 11 carried in a bezel 12 connected to the casing at one side by a suitable hinge 13 and provided on its free edge with a lock 14 the construction of which is not deemed necessary here to be shown, it being merely essential that the lock shall be of such character as to prevent access to the interior of the device by unauthorized persons. In the lower part of the casing is a boss 15 wherethrough passes a shaft 16 which is adapted for connection to a flexible shaft 17, the latter being in turn connected to the hub of one of the wheels of the vehicle in any suitable manner as by the gearing 18.

On the shaft 16 is a bevel gear 19 which meshes with a bevel gear 20 carried on a shaft 21 which extends transversely of the shaft 16. This bevel gear 20 is provided with a sleeve 22 which is splined to the shaft 21 and this sleeve is held in a bearing 23, the bearing thus supporting the shaft 21 at this point while permitting it to move longitudinally and to rotate. At 24 is a bearing for the shaft 21 which permits said shaft to rotate or to slide in the bearing. The gear 20 is in such position that it bears against one side of the bearing 23 and on the other end of the sleeve 22 is fixed a disk 25, the arrangement of the parts being such that the bearing is held between the gear 20 and disk 25, thus preventing the movement of the sleeve longitudinally of said bearing. Fixed on the shaft 21 adjacent the bearing 24 is a second disk 26 and to each of the disks 25 and 26 are pivoted a series of governor arms 27 which are arranged to swing in planes radial to the axis of the shaft 21. These arms are connected in pairs by means of links 28 each end of each link being pivoted to a respective arm. Fixed on these links 28 are governor weights 29. In the operation of this portion of the device it will be seen that when the shaft 16 is rotated by the action of the shaft 17 the shaft 21 will likewise be rotated. This will cause the governor balls to move out in the manner common to such devices and by the provision of the peculiar limp connection between the arms 27 this movement is accomplished in a very regular and easy manner. As the balls 29 move out under the influence of centrifugal force the disk 26 will be drawn toward the disk 25 and the shaft 21 moved through the sleeve 23. Extending through the center of the dial 11 is a shaft 30 surrounding which is a sleeve 31 carrying a circular ratchet 32. Secured at one end to the sleeve 31 is a spring 33 the other end of which is secured to the front of the casing behind the dial. Pivotally mounted on the casing is a pawl 34 which engages the ratchet 32, being held against said ratchet by a suitable spring 35. Extending out from the ratchet 32 is a pin 36 which is adapted to be engaged by an arm 37 fixed to the shaft 30. On this shaft 30 is a gear 38 which meshes with a segmental gear 39 carried on one arm of the lever 40 which is pivoted to the casing and which has a second arm 41 projecting in a direction opposite to the arm carrying the gear 39. Pivoted to the end of the arm 41 is a link 42 which is connected by a ball and socket joint with one arm of a lever 43. The other arm of the lever 43 has a bearing 44 connected thereto by a ball and socket joint, said bearing being arranged for the reception of the end of the shaft 21.

At 45 is a standard which extends from the casing and to the end of this standard is pivoted a lever 46 having one end of a spring 47 connected thereto, the other end of said spring being connected to the arm 41 of the lever 40. At the end of the lever 46 opposite said spring there is provided a fork 48 which straddles a screw 49 having a thumb nut 50 thereon. By means of this thumb nut the lever 46 may be moved to varying angular relation with the standard 45 and the spring 47 be thus given varying degrees of tension. At 51 is a feed tube for oil or other lubricant and this feed tube is provided with a plurality of branches 52 arranged to extend to the various bearing points so that oil inserted through the feed tube will be led to the points requiring lubrication.

On the end of the shaft 30 is a pointer 53 and on the end of the sleeve 31 is a similar pointer 54. In the operation of this portion of the device when the shaft 21 is moved longitudinally by the action of the governor the lever 43 will be moved around its pivot and will in turn move the lever 40 against the resistance of the spring 47. This will cause the segmental gear 39 to rotate the gear 38 and consequently actuate the shaft 30. As the shaft 30 rotates the arm 37 engages the pin 36 and rotates the ratchet 32 thus carrying the sleeve 31 around with the shaft in one direction. Whenever the speed slacks off the arm 37 moves backward away from the pin 36 as the latter is held by the ratchet and pawl from said backward movement. Now the rotation of the sleeve 31 carries with it the pointer 54 so that this pointer is carried around to the full extent to which the pointer 53 is moved and is left in that position when the pointer 53 moves backward. The pointer 54 will thus indicate the maximum speed attained while the pointer 53 will indicate the speed at which the automobile happens to be running at any given time. Upon arriving at the garage or other point of control the casing may be opened and the pawl released to allow the pointer 54 to resume its position at zero.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a device of the kind described, a governor mechanism including a longitudinally movable shaft, a lever pivoted intermediate its ends and having one end connected to the shaft, a link having one end connected to the free end of the lever, a second lever having one arm connected to the free end of said link and the other arm provided with a segmental gear, a spring connected to the first arm of the last mentioned lever, means to adjust the tension of said spring, a dial, a shaft passing through said dial, a gear on the last mentioned shaft meshing with the segmental gear, a sleeve on the last mentioned shaft, a ratchet on said sleeve, a pawl engaging said ratchet, a spring connected to said sleeve and constantly urging said sleeve to rotate, a pin projecting from the ratchet, an arm on the last mentioned shaft engaging said pin as the shaft is rotated to move the sleeve against the spring, and hands on said sleeve and last mentioned shaft traveling over said dial.

2. A speed indicator including a dial, a shaft passing through said dial, a gear on said shaft, a sleeve on said shaft, a ratchet on said sleeve, a pawl engaging said ratchet, a spring connected to said sleeve to constantly urge said sleeve to rotate, a pin projecting from the ratchet, an arm on the shaft engaging said pin as the shaft is rotated to move the sleeve against the spring, hands on said sleeve and shaft traveling over said dial, and centrifugally controlled means connected to the gear for actuating the said hands.

3. A speed indicator including a dial, a shaft passing through said dial, a gear on said shaft, a sleeve on said shaft, a ratchet on said sleeve, a pawl engaging said ratchet, a spring connected to said sleeve to constantly urge said sleeve to rotate, a pin projecting from the ratchet, an arm on the shaft engaging said pin as the shaft is rotated to move the sleeve against the spring, hands on said sleeve and shaft traveling over said dial, actuating mechanism for the hands including a longitudinally movable shaft, and means connecting the first mentioned shaft and the longitudinally movable shaft for actuating the former upon movement of the latter.

4. In a device of the kind described, a governor mechanism including a longitudinally movable shaft, a lever pivoted intermediate its ends and having one end connected to the shaft, a link having one end connected to the free end of the lever, a second lever having one arm connected to the free end of said link and the other arm provided with a segmental gear, a spring connected to the first arm of the last mentioned lever, means to adjust the tension of said spring, a dial, hands movable over the face of said dial, and means connecting the hands and the segmental gear for moving said hands in the same direction upon the movement of the said shaft.

In testimony whereof, I affix my signature, in presence of two witnesses.

WALTER E. PARR.

Witnesses:
M. S. BRAKMAN,
R. G. LANGSTON.